P. W. Murray,
INVENTOR

BY Victor J. Evans
ATTORNEY

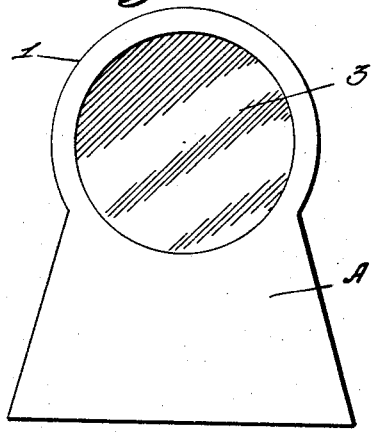
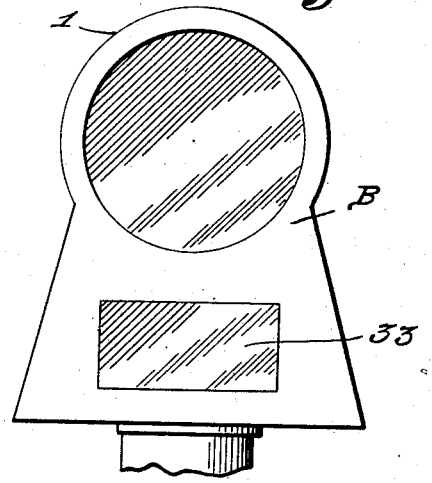
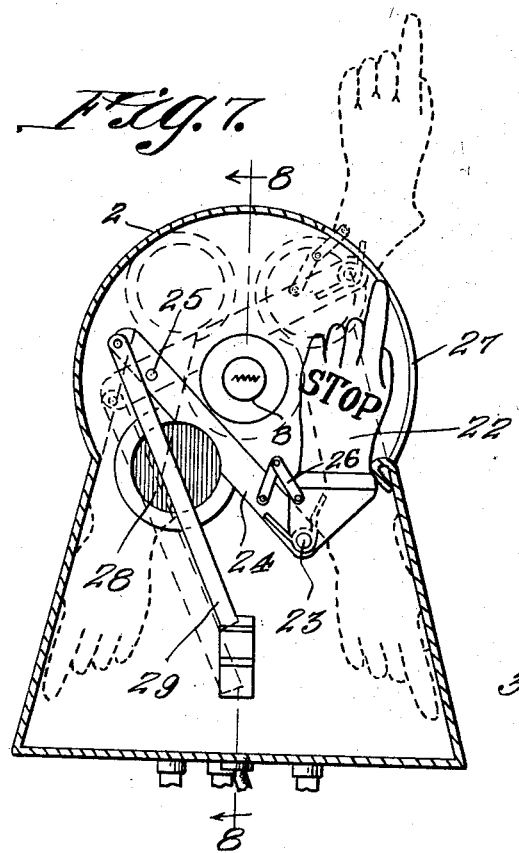
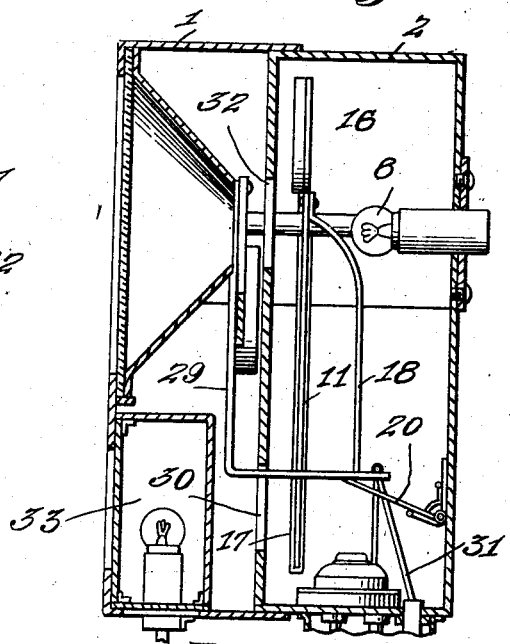

June 2, 1931. P. W. MURRAY 1,808,677
AUTOMOBILE SIGNAL DEVICE
Filed July 17, 1929   5 Sheets-Sheet 3
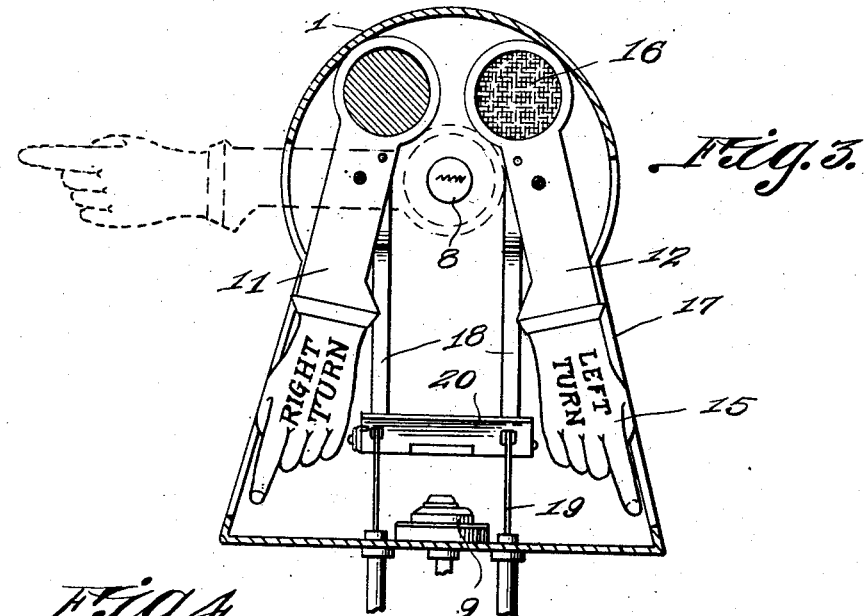
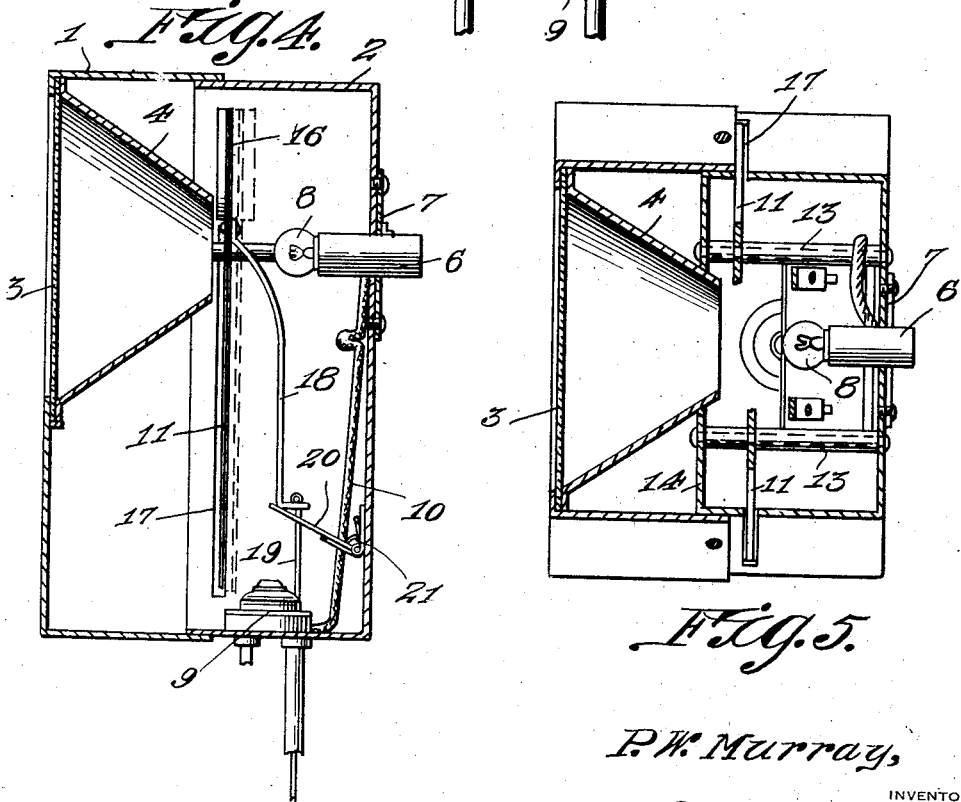
P. W. Murray,
INVENTOR
BY Victor J. Evans
ATTORNEY June 2, 1931.  P. W. MURRAY  1,808,677
AUTOMOBILE SIGNAL DEVICE
Filed July 17, 1929   5 Sheets-Sheet 4
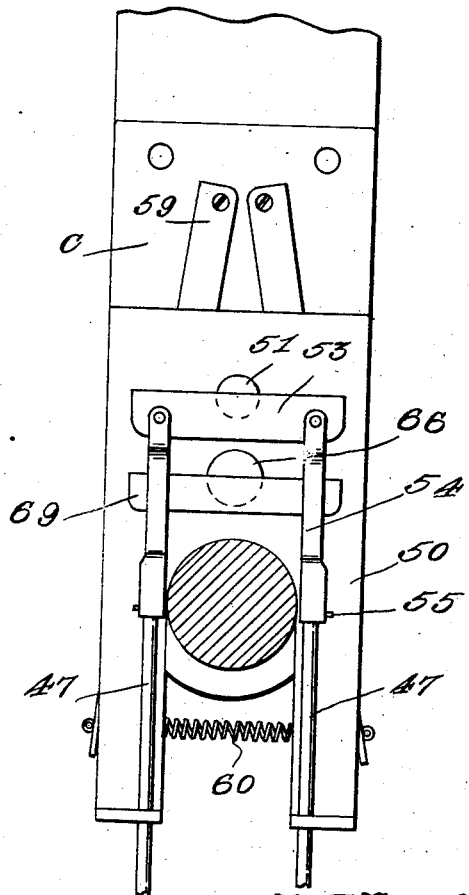
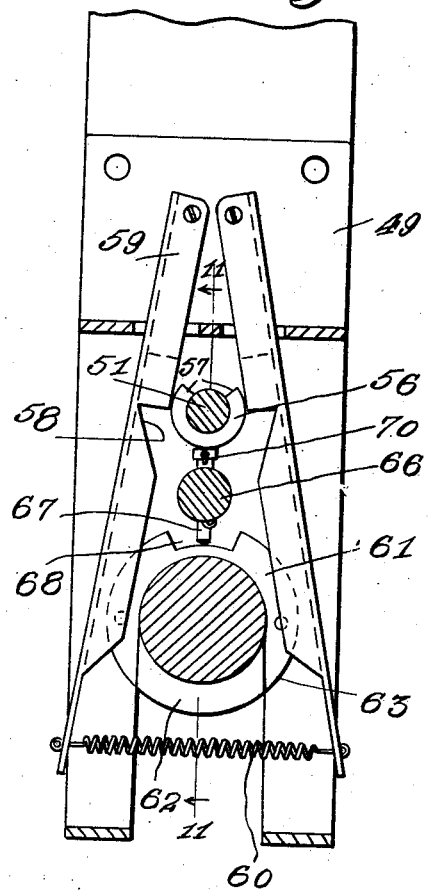
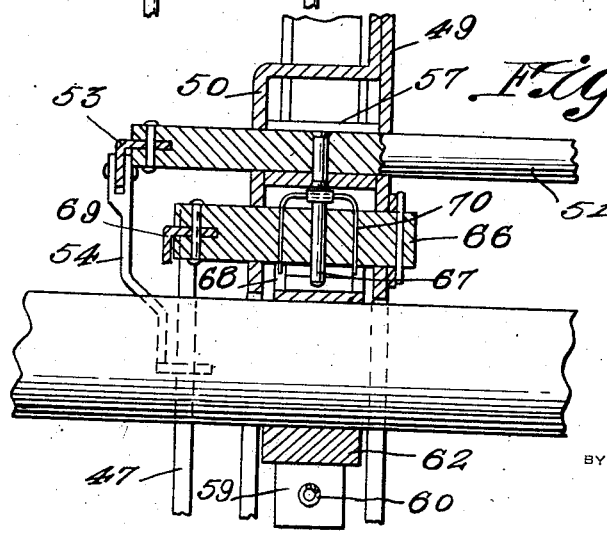
P. W. Murray,
INVENTOR
BY Victor J. Evans
ATTORNEY June 2, 1931.   P. W. MURRAY   1,808,677
AUTOMOBILE SIGNAL DEVICE
Filed July 17, 1929   5 Sheets-Sheet 5
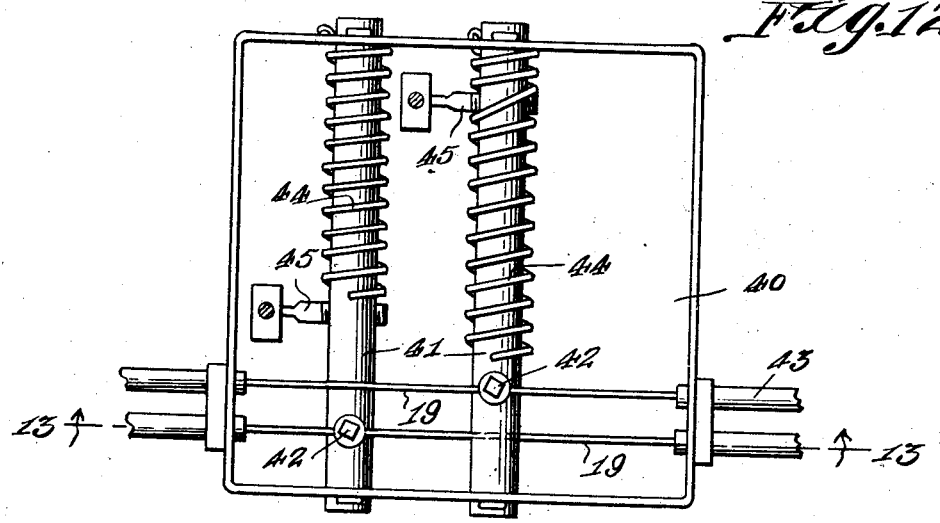
*Fig. 12.*
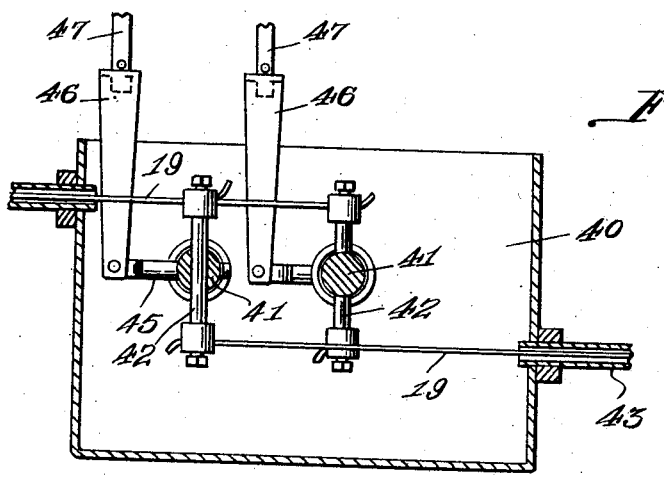
*Fig. 13.*
*Fig. 15.*
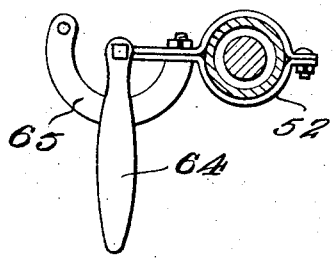
P. W. Murray,
INVENTOR
BY Victor J. Evans
ATTORNEY Patented June 2, 1931

1,808,677

UNITED STATES PATENT OFFICE

PATRICK WILLIAM MURRAY, OF DUBUQUE, IOWA

AUTOMOBILE SIGNAL DEVICE

Application filed July 17, 1929. Serial No. 379,035.

This invention relates to a directional signal for motor vehicles and the like, the general object of the invention being to provide means at the front and rear of the vehicle for indicating when the vehicle is to be turned to either the left or right, with means actuated by the driver for moving the before mentioned means into operative position and with means associated with the steering column for permitting the indicating means to return to normal position as the turn is being made.

Another object of the invention is to provide means whereby the turning of the vehicle to either the right or left will operate the indicating means if the driver should fail to operate the hand control means.

A still further object of the invention is to provide a stop signal associated with the indicating means at the rear of the vehicle, with means for actuating the same when the clutch pedal is depressed.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a view of the front lamp.

Figure 3 is a vertical sectional view through said lamp.

Figure 4 is a vertical sectional view through the lamp, this section being taken at right angles to Figure 3.

Figure 5 is a horizontal sectional view through the front lamp.

Figure 6 is a view of the rear lamp.

Figure 7 is a vertical sectional view through the rear lamp.

Figure 8 is a section on line 8—8 of Figure 7.

Figure 9 is a section on line 9—9 of Figure 1.

Figure 10 is a section on line 10—10 of Figure 1.

Figure 11 is a section on line 11—11 of Figure 10.

Figure 12 is a top plan view with the top removed of the casing which contains the rock shafts for pulling the cables leading to the lamps.

Figure 13 is a section on line 13—13 of Figure 12.

Figure 15 is a section on line 15—15 of Figure 1.

Figure 1:
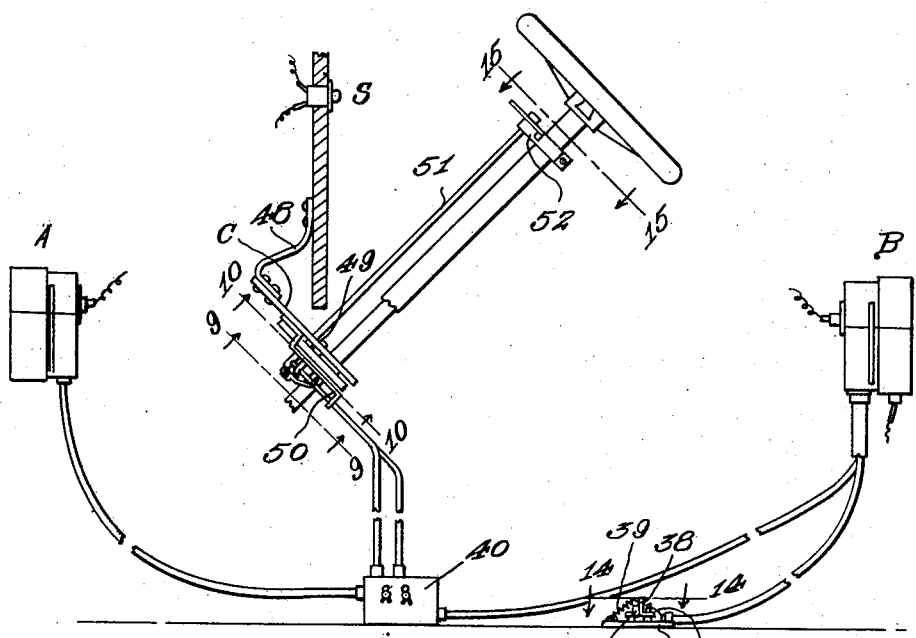
Figure 1 is a diagrammatic view showing the invention applied to a motor vehicle.

In these drawings, A indicates a lamp which is adapted to be placed on the front part of a vehicle and B indicates a lamp which is adapted to be placed on the rear part thereof. Each lamp is composed of a front section 1 and a rear section 2, the rear section fitting in the front section and the front section having an opening therein which is covered by a clear lens 3, a reflector 4 being arranged in the casing behind the lens, with the small end of the reflector open. A lamp socket 6 is carried by a plate 7 which is detachably connected with the rear of the casing and this socket is so arranged that the rays of light from the bulb 8 therein will pass through the reflector and the lens 3. A push button switch 9 is arranged in the bottom of the casing and is electrically connected with a suitable source of current, conductors 10 connecting the switch with the terminals of the bulb.

Arms 11 and 12 are pivoted intermediate their ends on the studs 13 connected with the rear of the lamp casing and with a partition 14 arranged in the casing. Each arm is formed with a miniature hand 15 at one end and has a lens 16 at its other end, the parts being so arranged that when the hand is in horizontal position, the lens 16 will cover the open rear end of the reflector so that the rays of light from the lamp must pass through the lens before passing through the reflector. The arm 11 has the words "Right turn" on its hand part and its lens is of green color, while the other arm has the words "Left turn" on its hand part and its lens is yellow. The sides of the casing are slotted, as shown at 17, so that when the arms are moved to a horizontal position, their hand carrying parts will project from the casing with the lens carrying part covering the opening in the reflector.

A strip 18 is connected with each arm at a point slightly above the pivotal point when the arm is in lowered position and a cable 19 is connected with the lower end of each strip so that when the cable is pulled upon, the arm will be swung into horizontal position. A plate 20 is connected by a spring hinge 21 with the rear of the casing and this plate has holes therein through which the cables pass so that when either cable is pulled upon to raise its arm, the plate 20 will be lowered against the button of the switch 9 and thus close the switch to light the lamp.

The rear lamp, as before stated, is made similar to the front lamp, but in addition, this rear lamp carries a third hand 22 which carries the word "Stop", this hand being connected by a spring pivot 23 with a lever 24 which is pivoted in front of the partition, as shown at 25. Toggle links 26 connect the hand with the lever so that as the lower end of the lever is raised, the hand will be caused to pass in an upright position through a slot 27 formed in the upper part of the casing. The lever is formed with an offset part which carries a lens 28 which is colored red and when the lever is actuated to project the hand from the casing, this lens will cover the opening in the reflector so that the rays of light passing from the lamp will be of red color. The strip 29 which is connected with the short end of the lever is bent and passes through an opening 30 in the partition and a cable 31 is connected with the lower end of this strip. This cable passes through a hole in the plate 20 so that when the cable is pulled upon to operate the "Stop" signal, the plate 20 will contact with the switch and thus close the circuit to the bulb. In this rear lamp, the reflector does not pass through the hole 32 formed in the partition, but in the front lamp the reflector passes through said hole. This rear lamp is formed with a tail lamp, indicated generally at 33.

Figure 14:
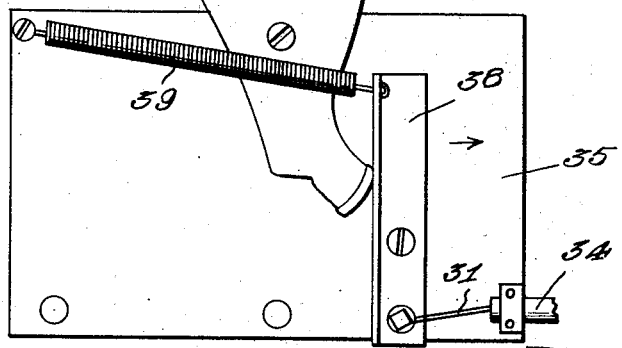
Figure 14 is a section on line 14—14 of Figure 1.

The cable 31 passes through a conduit 34 which has its other end fastened to a plate 35 which may be fastened to the floor boards of the vehicle adjacent the clutch pedal. This plate has pivoted thereto a forked member 36, the prongs of which extend one on each side of the clutch pedal, a part of which is shown at 37, so that the forked member will be rocked when the pedal is depressed. The inner end of the forked member engages a lever 38 pivoted intermediate its ends to the plate and to the short end of which the cable 31 is fastened, a coil spring 39 being connected with the long end of the lever, with its other end connected with the plate. This spring tends to hold the lever and the forked member 36 in neutral position, but when the pedal is depressed, the forked member will be rocked and as its inner end engages the lever 38, said lever will be moved in the direction of the arrow in Figure 14, and thus pull upon the cable 31 to cause said cable to swing the lever 24 in the rear lamp to a position where the "Stop" signal hand will be projected from the lamp casing and the red lens 28 moved over the opening in the reflector so that a red light will appear through the lens of the rear lamp, thus indicating that the vehicle is to stop. When the pedal returns to its normal position, the spring 39 will pull the lever 38 back to its normal position and thus permit the lever 34 and the hand 22 in the rear lamp to drop to their normal positions and at the same time the spring hinge of plate 20 will raise said plate and thus break the circuit to the lamp bulb.

A casing 40 is fastened to a suitable part of the vehicle and a pair of rock shafts 41 is aranged in said casing. A pair of studs 42 extend at right angles from each rock shaft and the cables 19 which are connected with the right hand signal arms of the front and rear lamps are connected with these studs on one shaft and the cables which are connected with the left hand signal arms of the front and rear lamps are connected with the studs of the other shaft. These cables pass through the conduits 43 which have their ends connected respectively with the lamps and with the casing 42. A coil spring 44 is wound on each shaft 41 with one end connected with the shaft and the other end with the casing, these springs tending to hold the shafts in a neutral position without tension on the cables.

A stud 45 is carried by each rock shaft and a clevis 46 is attached to each stud 45. A pull rod 47 has its lower end threaded in an opening in each clevis so that the pull rod is adjustably connected with the clevis. These pull rods pass upwardly and have their upper portions guided in holes formed in a frame C which is connected to the dash or instrument board of the vehicle by a bracket 48. The frame C is composed of two parts 49 and 50, these parts being formed with an opening in their lower portions through which passes the steering shaft of the vehicle. A shaft 51 has its upper end journaled in a bracket 52 which is clamped to the upper part of the steering column and said shaft passes through the frame C and its lower end has attached thereto a cross piece 53 to each end of which is pivoted a bar 54. The lower end of each bar 54 is forked to straddle each pull rod 47, a pin 55 passing through each pull rod immediately above the forked part of the bar 54. Thus each bar 54 can move downwardly on the pull rod without affecting the rod, but an upward movement of the bar 54 will cause its forked end to engage the pin and thus a pull will be exerted upon the rod 47. A member 56 is carried by the shaft 51 and forms a pair of shoulders 57 which are adapted to engage the upper walls of the notches 58 formed in the latch bars 59 which have their upper ends pivoted to the frame C and their lower ends connected together by a spring 60. Thus when the shaft 51 is turned in one direction or the other, as soon as a shoulder 57 passes into a notch in a latch bar, the spring will cause said latch bar to move inwardly and thus the shaft 51 will be held in its adjusted position. A two-part collar 61 is fastened to the steering shaft and this collar is formed with an enlargement 62 which forms shoulders 63 which are arranged to strike the latch bars when the steering shaft is turned so that the latch bar engaged by the shoulder will be pushed outwardly and thus release the shaft 51 so that the spring 44 on the rock shaft 41 can return the parts to neutral position. In this way, the signal can be set by the driver turning the shaft 51 by means of its handle 64 which works over the quadrant 65 carried by the bracket 52 to set the signals for a left or right hand turn and then as the steering wheel is rotated to make the turn, the shoulder on the collar 61 on the steering shaft will release the latch member and thus permit the signals to return to inoperative position.

A stub shaft 66 is journaled in the frame C and carries a pin 67 which extends into a notch 68 formed in the collar 61 so that as the steering shaft is turned, one of the walls of the notch, striking the end of the pin, will rotate the shaft 66 and thus set the signals in the lamps automatically as the shaft 66 has fastened thereto a cross piece 69, the ends of which slidingly engage the pull rods 47, said pull rods having pins therein, one of which is engaged by the upwardly moving part of the cross piece 69 to exert a pull on the pull rod. The pin 67 is held in position by a spring 70 which will yield and permit the pin to move outwardly if the steering shaft should be moved so far as to cause the pin to leave the notch 68. This will prevent damage to the parts.

A switch S is mounted on the instrument board or dash of the vehicle and this switch is electrically connected with the bulb 8 in the rear lamp so that when the operator wishes to back the vehicle, he may close this switch so as to get a clear white light from the rear lamp to enable him to see where he is backing.

From the foregoing it will be seen that when the driver of the vehicle desires to make a right or left hand turn, he would move the handle 64 to the right of left, the quadrant 65 having indications thereon to enable the driver to place the handle in the correct position. This would turn the shaft 51 so as to move the cross piece 53 and cause the upwardly moving member 54 to exert a pull on one of the pull rods 57. Thus the rock shaft 41 to which the pull rod is connected would be turned against the action of its spring and this movement of the rock shaft would exert a pull on the cables 19 which are attached to it and these cables would raise the signal arms to expose the hand part thereof and to place its lens across the path of the light rays from the lamp bulb, the circuit of the bulb being closed at the same time by the pressure of the plate 20 on the switch 9. Thus signals would appear at the front and rear of the vehicle to indicate that the vehicle is to make a right or left hand turn. The latch bar 59, engaging a shoulder 57 on the part 56, would hold the signals in set position until the steering mechanism is moved to cause the vehicle to make a turn. Then a shoulder 63 on the collar 61 will strike the latch bar and move it to releasing position so that the spring 44 on the rock shaft 41 will return the parts to neutral position and the signal arms will drop within the lamp casings and at the same time the circuits to the lamp bulbs will be broken. As before stated, when the right signal arm is in raised position, the green light will be shown by each lamp and when the left signal arm is in operative position, a yellow light will be given by each lamp. If the driver should fail to operate the handle of the shaft 51, as soon as he started to make a turn, the collar 61 would rock the shaft 66 and thus the signals would be set automatically in the same manner as they are set by hand, the signal means returning to inoperative position as soon as the turn is made. When the clutch pedal is depressed, the member 36 will operate the member 38, thus exerting a pull upon the cable 31 to raise the stop signal device in the rear lamp and at the same time to apply current to the lamp bulb and place the red lens across the path of the light rays so that the red lamp will give a light.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. An automobile signal device including pivotally mounted signal arms having signalling and non-signalling positions and a supporting casing, shafts journaled in the casing, studs on the shafts, flexible means connecting the studs to the signal arms, operating means connected to the shafts for rotating the latter in one direction to move the signal arms into their signalling position, and tension means connected to the shafts and casing to rotate the shafts in an opposite direction when released by the operating means to permit the signal arms to assume non-signalling position.

2. An automobile signal device including a frame associated with a steering post, rods slidable on the frame, connecting means between the rods and signal arms, an operating shaft carried by the frame, means connecting the operating shaft to the rods to move the latter in one direction for positioning the signalling arms in signalling position by movement of the shaft, latching bars pivoted to the frame and disposed at opposite sides of the operating shaft and the steering post and having notches, tension means connecting the bars to urge said bars toward the operating shaft and the steering post, a locking member secured to the operating shaft to engage the notches to hold the operating shaft in an adjusted position, a member secured to the steering post to expand the locking bars during the rotation of the steering post for disengaging the notches from the locking member and freeing the operating shaft, and means for returning the connecting means and bars to their initial position when the operating shaft is free and permit the signal arms to move into non-signalling position.

3. An automobile signal device including a frame receiving a steering post, rods slidable on the frame, connecting means between the rods and signal arms, an operating shaft carried by the frame, connecting means attaching the operating shaft to the rods to move the latter in one direction for positioning the signal arms in signaling position, yieldable latching bars pivoted to the frame and having notches, a locking member on the operating shaft and having shoulders to engage the notches to hold the operating shaft in adjusted positions, means engaging the locking bars by the movement of the steering post to disengage the notches from the shoulders for freeing the operating shaft, and means for returning the first connecting means and the rods to their initial position when the operating shaft is free and permit the signal arms to return to non-signalling position.

In testimony whereof I affix my signature.

PATRICK WILLIAM MURRAY.